April 29, 1969 M. L. IVERSON 3,441,441
GALVANIC CELL ELECTROLYTE

Filed April 2, 1965

INVENTOR.
MARLOWE L. IVERSON
BY Henry Kolin
ATTORNEY

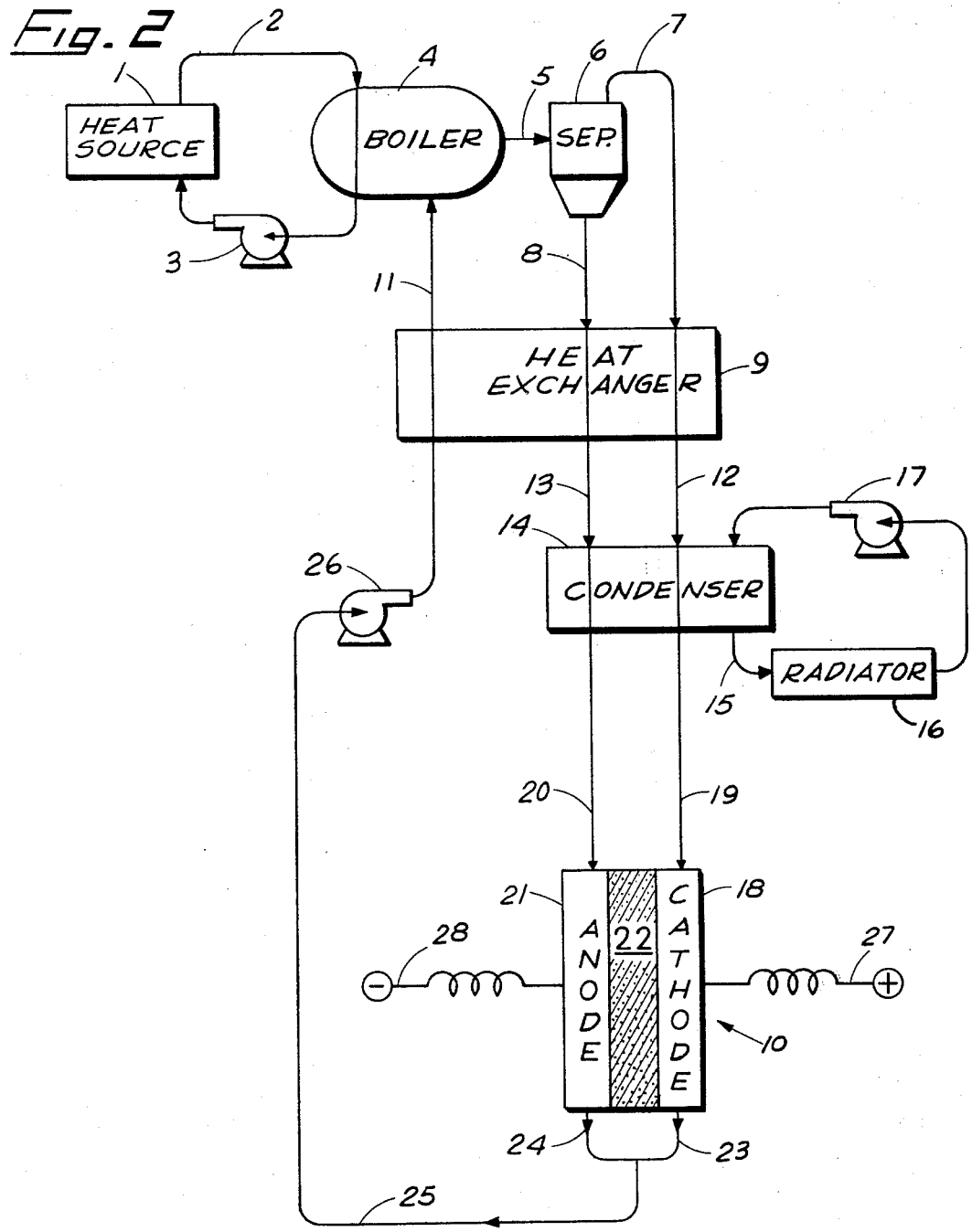

United States Patent Office 3,441,441
Patented Apr. 29, 1969

3,441,441
GALVANIC CELL ELECTROLYTE
Marlowe L. Iverson, Simi, Calif., assignor to North American Rockwell Corporation, a corporation of Delaware
Filed Apr. 2, 1965, Ser. No. 444,955
Int. Cl. H01m 11/00
U.S. Cl. 136—83                                    9 Claims

ABSTRACT OF THE DISCLOSURE

Fusible sodium salt mixtures and a sodium-amalgam galvanic cell utilizing the mixed sodium salts as a fusible electrolyte therein. The salt mixture is a ternary or quaternary salt system and contains at least three components selected from sodium cyanide, sodium fluoride, sodium iodide, and sodium carbonate, no component being present in amount in excess of 80 mole percent, sodium carbonate being present in amount below 20 mole percent. A preferred ternary mixture of eutectic composition contains, in mole percent, 58±1 sodium cyanide, 30±1 sodium iodide, and 12±1 sodium fluoride.

---

Figure 1A:
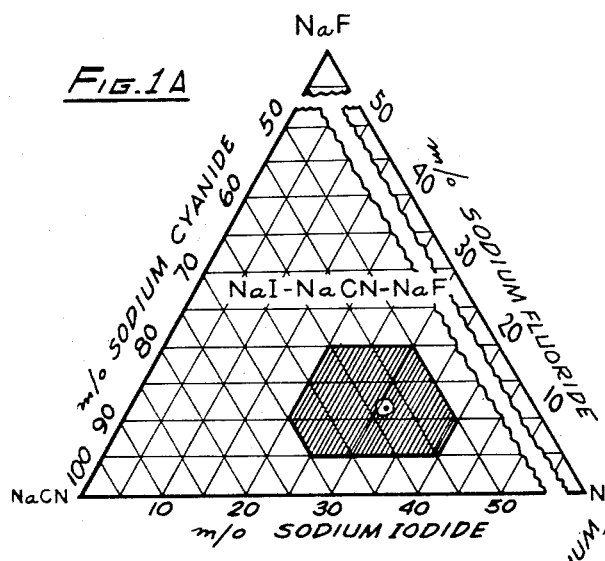

This invention relates to novel ternary and quaternary fusible sodium salt systems. It further relates to a sodium-amalgam galvanic cell or battery utilizing these mixed sodium salts as a fusible electrolyte therein. More particularly it relates to a galvanic cell electrolyte consisting of a ternary eutectic mixture of sodium salts.

A thermally regenerative energy conversion system is a closed-cycle heat engine for converting heat energy to electricity without the use of moving parts such as turbines or other rotating machinery. Galvanic cells have been heretofore considered for use as components in such thermally regenerative systems. See "The Thermally Regenerative Liquid-Metal Cell" by B. Agruss, Journal of the Electrochemical Society, vol. 110, pp. 1097–1103 (1963); "Mercury Space Power Systems" by R. E. Henderson and E. H. Hietbrink, in Direct Conversion, 1962 Pacific Energy Conversion Conference Proceedings, pp. 16–1 to 16–12 (1962). Generally, such cells have been of limited practical interest because of the presence of several of the following deficiencies: low single cell voltage, low cell current density, difficulty of materials handling and regeneration, lack of compatibility with usable heat sources, and cell component degradation resulting in short cell life.

The selection of the electrolyte has been found to be a significant factor in overcoming many of the foregoing deficiencies present in alkali metal-amalgam galvanic cells. Thus where a high temperature sodium-mercury galvanic cell is used in a thermally regenerative system, an electrolyte is required which will efficiently transport sodium ions from one electrode to the other. In addition, it should be liquid below 550° C. and thermally stable at this temperature. Further, it should not react appreciably with or exhibit appreciable reciprocal solubility with sodium alloys at the elevated temperature of operation. In addition, it should have a satisfactory electrical and thermal conductivity at the temperature of operation. Heretofore, proposed electrolytes have been deficient in several respects. Where fused alkali metal oxygen-containing salts have been used, such as hydroxides and oxides, serious degradation of the cell components has resulted because of interaction of the electrolyte with the mercury and alkali metal, as well as attack of the ceramic material of the electrolyte container, with resultant shortened cell life.

Accordingly, it is an object of the present invention to provide a galvanic cell for use in a thermally regenerative system that minimizes prior art disadvantages heretofore present.

Another object is to provide a galvanic cell with improved resistance to cell component corrosion.

Still another object is to provide a cell with a relatively high power to weight ratio.

Still another object is to provide a galvanic cell with increased cell life for both space and terrestrial applications.

Yet another object is to provide a mixture of fusible sodium salts particularly suitable for use as an electrolyte in a sodium-mercury galvanic cell.

An additional object is to provide a relatively low melting eutectic mixture of sodium salts which satisfies the requirements of an electrolyte for use in a sodium alloy galvanic cell.

A further object is to provide an improved thermally regenerative sodium-amalgam system.

In accordance with this invention there is provided a fusible sodium salt mixture for use as an electrolyte in a thermally regenerative sodium-amalgam galvanic cell. This mixture is a ternary or quaternary salt system that contains at least three components of the following salts: sodium cyanide, sodium fluoride, sodium iodide, and sodium carbonate, no component being present in amount in excess of 80 mole percent, sodium carbonate being present in amount below 20 mole percent. The sodium salt mixture is utilized as an electrolyte in a thermally regenerative sodium-amalgam galvanic cell whose anode consists of a sodium-rich amalgam and whose cathode consists of a sodium-poor amalgam, the cathode and anode amalgams and the electrolyte salt being molten at the normal operating temperature of the cell. The term "cell" as used herein is broadly intended also to include a "battery", e.g., an assemblage in series or parallel arrangement of two or more electric cells.

Other objects, advantages, and features of the invention will appear from the following description of a preferred embodiment of the invention wherein FIG. 1 of the drawing, utilizing a triangular coordinate scale, shows preferred proportions of four different ternary salt systems that may be utilized as electolyte, and FIG. 2 is a schematic representation of a thermally regenerative alloy cell system employing a sodium-amalgam galvanic cell and utilizing the sodium salt mixture as electrolyte.

Referring to FIG. 1A, the NaI-NaCN-NaF ternary salt system is shown. As may be noted from the figure, the relative proportions of the three components, in mole percent, are as follows: 20–40 NaI, 50–70 NaCN, and 5-20 NaF. Particularly preferred for use in the practice of this invention is the fusible ternary salt mixture of eutectic composition, shown by a circle in the graph in FIG. 1A, which consists essentially of, in mole percent 30±1 sodium iodide, 58±1 sodium cyanide, and 12±1 sodium fluoride. This composition has a melting point of approximately 477° C. (±5° C.).

Where a composition of lower melting point is desired, up to 20 mole percent sodium carbonate may be added to the ternary NaI-NaCN-NaF system. The resulting quaternary salt system has a melting point about 25–50° C. below that of the ternary eutectic composition. However, while the addition of sodium carbonate is advantageous in lowering the melting point, it has the disadvantage of being slightly soluble in the sodium-amalgam system, and also of slightly attacking the ceramic material in which the electrolyte is generally immobilized. Thus additions of sodium carbonate should be kept to a minimum, preferably below 5 or 10 mole percent. To avoid corrosion of the ceramic material, it is important that moisture be initially excluded from the salt mixture in order to minimize formation of hydroxides or oxides, which have a corrosive effect on both the cell electrodes and the ceramic material in which the electrolyte is contained. While the presence of various inadvertent and trace impurities may be tolerated, these should be kept at a minimum in the salt mixture in order to maintain high cell efficiency and long cell life.

Figure 1B:
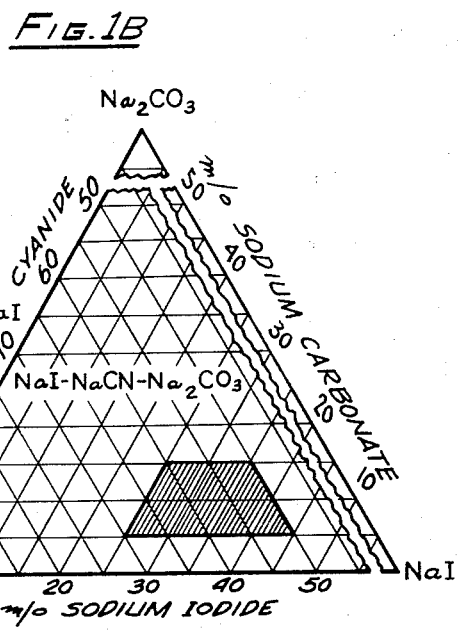
Figure 1C:
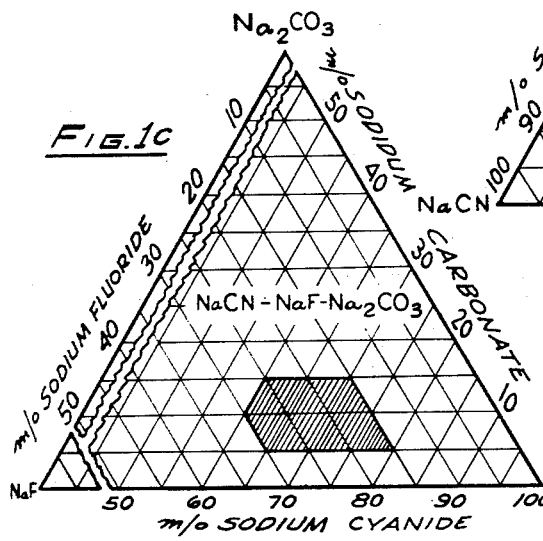
Figure 1D:
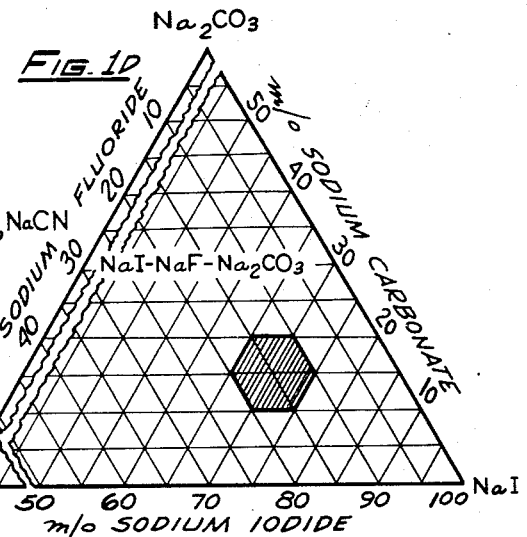

Referring to FIG. 1B, it is noted that the fusible ternary salt mixture shown, $NaI-NaCN-Na_2CO_3$, consists essentially, in mole percent, of 25–45 sodium iodide, 50–70 sodium cyanide, and 5–15 sodium carbonate. A third species of fusible ternary salt mixture, $NaCN-NaF-Na_2CO_3$, is shown in FIG. 1C. As may be noted, this consists essentially, in mole percent, of 60–80 sodium cyanide, 15–30 sodium fluoride, and 5–15 sodium carbonate. Still another species of fusible ternary salt mixture, $NaI-NaF-Na_2CO_3$, is shown in FIG. 1D. This consists essentially of, in mole percent, 65–75 sodium iodide, 10–20 sodium fluoride, and 10–20 sodium carbonate.

In FIG. 2 is shown the utilization of the sodium-amalgam galvanic cell of this invention in a thermally regenerative alloy cell system. A heat source 1 is used to heat a fluid which is circulated in a closed conduit loop 2 by means of a pump 3 through a boiler 4. Conveniently, for space applications, the heat source is a nuclear reactor and the circulating heat-transfer fluid is sodium-potassium liquid metal. This fluid may be circulated utilizing an electromagnetic pump, thereby eliminating moving mechanical parts. Heat source 1 may also be a radioisotope, e.g., plutonium-238 for a long-term space mission or cerium-144 for a short-term mission. These heat sources are also suitable for terrestrial applications. For other applications, particularly where conventional sources of heat are employed such as fossil fuels, the heat source loop may be eliminated and the boiler heated directly.

For the sodium-amalgam cell, a boiler temperature below the boiling point of sodium and preferably between 1200° F. and 1400° F. (650–750° C.) is maintained. The sodium-mercury mixture in the boiler contains preferably between 10 and 20 atom percent sodium. The heated sodium-amalgam mixture in boiler 4 passes through a conduit 5 to a separator 66, where the mixture is separated into a sodium-poor vapor, e.g., mercury vapor containing between 0 and 10 atom percent sodium, and a sodium-rich liquid amalgam containing between 15 and 80 atom percent sodium. The specific composition of the separated components is determined by boiler efficiency and the temperature and pressure maintained in the boiler. The separator is conveniently a centrifugal cyclone type because of its high collection efficiency for space applications. Where the source temperature is high, above 1400° F., the mercury vapor stream may contain excessive amounts of sodium. This can be minimized by using at least a two-stage boiler-separator.

At a temperature of 1300° F. and a system pressure of about 125 p.s.i.a. the mercury vapor passing through an overhead conduit 7 of separator 6 contains approximately 0.4 atom percent (a/o) sodium. This sodium-poor mercury vapor, following condensation, constitutes the cathode stream. The anode stream consists of molten sodium-amalgam which passes through a bottom conduit 8. At 1300° F. this liquid stream contains approximately 37.5 a/o sodium.

The anode and cathode streams pass through a heat exchanger 9 wherein heat is given up to a recycle effluent stream from a galvanic cell 10, this stream being returned to boiler 4 through a conduit 11. The cathode and anode streams pass from heat exchanger 9 through respective conduits 12 and 13 to a condenser-cooler 14 wherein the streams are further cooled and the mercury vapor of the cathode stream is condensed.

For convenience in schematic representation, condenser-cooler 14 has been shown as a separate unit from heat exchanger 9. Similarly, boiler 4 has been shown as a separate unit from separator 66. However, for optimizing system weight and efficiency, particularly for space applications, it may be desirable to combine the boiler and separator in one unit and also to combine the heat exchanger and condenser-cooler. Since the system described herein is a heat engine that is Carnot-cycle limited, its efficiency is increased by maintaining a maximum feasible difference in temperature between that of boiler 4 and that at which galvanic cell 10 is operated. Waste heat may be additionally rejected to space by means of a fluid circulating through a closed conduit loop 15 to a radiator 16, circulated by means of a pump 17. The condenser-cooler 14 and radiator 16 may be combined where direct radiation of waste heat is desired. Thereby circulation of a heat-transfer fluid through external loop 15 is eliminated.

The sodium-poor amalgam stream enters a cathode compartment 18 of galvanic cell 10 by way of conduit 19. Similarly, the sodium-rich amalgam stream is conducted by way of conduit 20 to an anode compartment 21 of galvanic cell 10.

An electrolyte compartment 22, which separates the cathode and anode compartments 18 and 21, consists of a porous ceramic matrix in which the electrolyte is contained. It is considered a particularly important and critical feature of this invention, in order to insure maximum cell life, high efficiency, and freedom from corrosion, which combined features result in a cell of practical utility, that the molten sodium salt mixture be substantially non-oxidizing, be relatively insoluble in the sodium and mercury streams, have good electrical conductivity, and be relatively low melting so as to provide good over-all Carnot-cycle efficiency. The ternary and quaternary salt systems of this invention have been found ideally suited to meet the foregoing requirements as electrolyte.

Galvanic cell 10 is maintained at a temperature that is suitably lower than the boiler temperature but sufficient to maintain the cathode and anode amalgams and the electrolyte in a molten state. In the galvanic cell, sodium ions from the sodium-rich amalgam in the anode compartment migrate through the molten electrolyte to the cathode compartment where they unite with the mercury to form a sodium-poor amalgam of higher sodium content than originally present in the cathode compartment. At the same time, the sodium-rich amalgam in the anode compartment is depleted to form a sodium-poor amalgam. The sodium-poor amalgam effluent from the cathode compartment, emerging from a conduit 23, and the sodium-poor effluent amalgam of the anode compartment, emerging from a conduit 24, are combined and conducted by way of a conduit 25 utilizing a pump 26 through heat exchanger 9, and then returned by way of conduit 11 to boiler 4 for regeneration and recycle in the system. The anode and cathode effluent streams may be of the same or different composition depending on the relative flow rates selected of these streams based on considerations of over-all efficiency and specific power output.

An electrical load (not shown) is conveniently connected across a positive terminal 27 and a negative terminal 28 of the galvanic cell. Since heat is being continually supplied by heat source 1 and electricity is being removed from the cell by way of terminals 27 and 28, this thermally regenerative system provides an efficient continuous energy conversion process for the conversion of heat to electricity. The following reactions (equations not balanced) occur in the system during operation:

BOILER AND REGENERATIVE HEAT EXCHANGER $$Na_xHg(l) \underset{\Delta}{\overset{T_H}{\rightleftharpoons}} Na_yHg(l) + Hg(g) \quad y > x$$

SEPARATOR $$Na_yHg(l) + Hg(g) \rightarrow Na_yHg(l)\downarrow + Hg(g)\uparrow$$

CONDENSER $$Hg(g) \rightarrow Hg(l) + Heat$$

GALVANIC CELL (a) Overall $$Na_yHg(l) + Hg(l) \xrightarrow{T_L} Na_xHg(l) + \text{Electric Energy}$$

(b) Anode (negative electrode)

$$Na_yHg(l) \rightarrow Na_xHg(l) + Na^+ + e^-$$

(c) Electrolyte $$Na^+ \text{ at Anode} \xrightarrow{\text{Migration}} Na^+ \text{ at Cathode}$$

(d) Cathode (positive electrode)

$$Na^+ + Hg + e^- \rightarrow Na_xHg(l)$$

The sodium salt mixture that is particularly suitable and preferred for use as the electrolyte in the sodium-amalgam galvanic cell is the eutectic mixture consisting of approximately 58 mole percent sodium cyanide, 30 mole percent sodium iodide, and 12 mole percent sodium fluoride. It has been found that the use of a high porosity beryllium oxide ceramic matrix to contain the molten electrolyte salts of this invention gives particularly superior results with respect to cell life and operability. This porous beryllia matrix is described and claimed in copending application (NAA Docket No. 4A126), filed of even date herewith and assigned to the assignee of the present invention.

The combination of sodium-amalgam galvanic cell electrodes and the mixed sodium salt system of this invention as electrolyte has been found to provide a particularly improved thermally regenerative galvanic cell system in which better separation of the mercury from the sodium is obtained, compared with the use of other alkali metals. Also, sodium has a lower vapor pressure in the system at a given regeneration temperature. In addition, corrosion at a given temperature is less in a sodium-containing system than one utilizing potassium. Furthermore, since the equivalent weight of sodium is less than that for potassium, with approximately equal cell voltages for the two systems a given power capability will require less weight using the sodium-amalgam system. The mixture of molten sodium salts is also less soluble in the metal electrodes than other alkali-metal salts, particularly oxygen-containing ones; similarly, these metal electrodes are less soluble in the electrolyte for a sodium system than for a potassium one.

The following examples are illustrative of this invention but are not intended to restrict the scope thereof as previously described.

EXAMPLE 1

The ternary eutectic, NaI-NaCN-NaF, was prepared by first drying each of the individual salts at 100° C. in vacuum for 1 hour. The relative proportions used corresponded, in mole percent, to 30.4 NaI, 57.8 NaCN, and 11.8 NaF. The salts were mixed and heated in vacuum at 300° C. for 17 hours followed by melting under an argon atmosphere at 525° C. for 2 hours.

As an alternative or supplementary purification procedure and particularly effective for removing any traces of oxygen-containing salts such as hydroxides, oxides, carbonates, sulfates, nitrates, oxalates, cyanates, or iodates, the ternary salt in the fused state was heated with molten sodium under an inert atmosphere at a temperature between 470 and 650° C. Heating times varied from 5 minutes up to 5 hours, depending on the temperature employed, lower temperatures requiring longer heating times. Volatile impurities were vaporized as a gas. The sodium layer containing the sodium-reactive and sodium-soluble impurities floated as a separate layer on the molten salt and could be removed by decantation or filtration.

The eutectic salt composition had a melting point of approximately 475° C. Its conductivity was measured over the 515–632° C. temperature range. The logarithm of the conductivity varied linearly with $1/T$ and fitted the following equation:

$$\text{Log } K = 1.074 - 595/T$$

EXAMPLE 2

Following the general procedure shown in Example 1, other ternary and quaternary systems useful as electrolyte were prepared. The proportions used and the thermal plateaus obtained (indicating a eutectic composition or a minimum inflection in the freezing-point curve) were as follows:

| Components | | | | Mole percent | | | | Thermal halts (° C.) |
|---|---|---|---|---|---|---|---|---|
| A | B | C | D | A | B | C | D | |
| NaCn | NaI | NaF | $Na_2CO_3$ | 52.3 | 31.8 | 8.8 | 6.9 | 441 |
| NaI | NaF | $Na_2CO_3$ | | 69.3 | 15.2 | 15.6 | | 558 |
| NaI | NaCN | $Na_2CO_3$ | | 33.6 | 55.4 | 11.0 | | 472 |
| NaF | NaCN | $Na_2CO_3$ | | 61.4 | 32.6 | 6.0 | | 469 |

EXAMPLE 3

A sodium-amalgam galvanic cell was operated at a temperature between 470° C. and 510° C. The electrolyte was contained in a porous beryllia matrix separating the cathode and anode amalgams. The electrolyte consisted of a eutectic mixture of 58 m/o NaCN, 30 m/o NaI, and 12 m/o NaF, having a melting point of approximately 475° C. The resistivity of the pure fused salt mixture was 0.5 ohm-cm. and the resistivity of the electrolyte-matrix combination was between 3.0 and 3.5 ohm-cm. The cell was operated at current densities in the range of 80 to 150 ma./cm.$^2$, with a maximum current density drawn of 360 ma./cm.$^2$ and a maximum power density of 160 mw./cm.$^2$. Cathode and anode amalgam feeds corresponding to open circuit voltages in the range 0.2 to 0.8 volt were studied. The measured voltages were found to match theoretical values. For an anode amalgam containing 50 atom percent sodium and a cathode amalgam containing 1 atom percent sodium, a voltage of 0.77 volt was obtained. With an anode amalgam content of 35 atom percent sodium and a cathode amalgam content of 10 atom percent sodium, the voltage was 0.41 volt. The cell was operated continuously for 176 hours with no evidence of cell deterioration.

While the principle, preferred construction, and mode of operation of the invention have been illustrated and described, it should be understood that within the scope of the appended claims the invention may be practiced otherwise than as specifically illustrated and claimed.

I claim:

1. A fusible salt mixture for use as an electrolyte in a thermally regenerative sodium-amalgam galvanic cell, said mixture being selected from the class consisting of ternary and quaternary salt systems and consisting essentially of at least three components selected from sodium cyanide, sodium fluoride, sodium iodide and sodium carbonate, no component being present in amount in excess of 80 mole percent, sodium carbonate being present in amount below 20 mole percent.

2. A fusible salt mixture selected from the class consisting of ternary and quaternary salt systems containing, in mole percent, 50–70 sodium cyanide, 20–40 sodium iodide, 5–20 sodium fluoride and 0–10 sodium carbonate.

3. A fusible ternary salt mixture of eutectic composition consisting essentially of, in mole percent, 58±1 sodium cyanide, 30±1 sodium iodide, and 12±1 sodium fluoride.

4. A fusible ternary salt mixture consisting essentially of, in mole percent, 50–70 sodium cyanide, 25–45 sodium iodide, and 5–15 sodium carbonate.

5. A fusible ternary salt mixture consisting essentially of, in mole percent, 60–80 sodium cyanide, 15–30 sodium fluoride, and 5–15 sodium carbonate.

6. A fusible ternary salt mixture consisting essentially of, in mole percent, 10–20 sodium fluoride, 65–75 sodium iodide, and 10–20 sodium carbonate.

7. A galvanic cell for use in a thermally regenerative system comprising an anode of a sodium-rich amalgam, a cathode of a sodium-poor amalgam, and an anhydrous electrolyte of a mixture of sodium salts selected from the class consisting of ternary and quaternary salt systems and consisting essentially of at least three components selected from sodium cyanide, sodium fluoride, sodium iodide and sodium carbonate, no component being present in amount in excess of 80 mole percent, sodium carbonate being present in amount below 20 mole percent, the cathode and anode amalgams and the electrolyte being molten at the normal operating temperature of the cell.

8. A galvanic cell according to claim 7 wherein the electrolyte contains, in mole percent, 50–70 sodium cyanide, 20–40 sodium iodide, 5–20 sodium fluoride, and 0–10 sodium carbonate.

9. A galvanic cell according to claim 7 wherein the electrolyte comprises a ternary salt system of eutectic composition consisting essentially of, in mole percent, 58±1 sodium cyanide, 30±1 sodium iodide, and 12±1 sodium fluoride.

References Cited

UNITED STATES PATENTS 1,843,698   2/1932   Ruben _____ 136—83.1
3,057,946   10/1962  Eidensohn _____ 136—86

WINSTON A. DOUGLAS, *Primary Examiner.*

C. F. LE FEVOUR, *Assistant Examiner.*

U.S. Cl. X.R.

136—153; 252—62.2

UNITED STATES PATENT AND TRADEMARK OFFICE
CERTIFICATE OF CORRECTION

PATENT NO. : 3,441,441
DATED : April 29, 1969
INVENTOR(S) : Marlowe L. Iverson

It is certified that error appears in the above—identified patent and that said Letters Patent are hereby corrected as shown below:

Column 3, line 54, "66" should read --6--.

Column 4, line 12, "66" should read --6--.

Signed and Sealed this

Tenth Day of August 1976

[SEAL]

Attest:

RUTH C. MASON
*Attesting Officer*

C. MARSHALL DANN
*Commissioner of Patents and Trademarks*